US006338159B1

(12) United States Patent
Alexander, III et al.

(10) Patent No.: US 6,338,159 B1
(45) Date of Patent: *Jan. 8, 2002

(54) SYSTEM AND METHOD FOR PROVIDING TRACE INFORMATION

(75) Inventors: William Preston Alexander, III; Robert Francis Berry; Riaz Y. Hussain, all of Austin; Chester Charles John, Jr., Round Rock; Frank Eliot Levine; Robert John Urquhart, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/343,424

(22) Filed: Jun. 30, 1999

Related U.S. Application Data

(63) Continuation-in-part of application No. 08/989,725, filed on Dec. 12, 1997, now Pat. No. 6,055,492.

(51) Int. Cl.[7] .................................................. G06F 9/44
(52) U.S. Cl. ........................... 717/4; 702/179; 702/186; 707/206; 710/56
(58) Field of Search ............................ 717/4; 702/179, 702/186, 187; 707/206; 714/35, 38; 710/56

(56) References Cited

U.S. PATENT DOCUMENTS

| 5,193,180 A | * | 3/1993 | Hastings ....................... 717/10 |
| 5,321,834 A | | 6/1994 | Weiser et al. ............... 707/206 |
| 5,335,344 A | * | 8/1994 | Hastings ....................... 714/35 |
| 5,539,907 A | | 7/1996 | Srivastava et al. ............. 717/5 |
| 5,649,085 A | | 7/1997 | Lehr .......................... 345/440 |
| 5,684,945 A | * | 11/1997 | Chen et al. .................... 714/20 |
| 5,689,712 A | | 11/1997 | Heisch .......................... 717/4 |
| 5,732,273 A | | 3/1998 | Srivastava et al. ............. 717/4 |
| 5,737,609 A | | 4/1998 | Reed et al. ..................... 717/4 |
| 5,748,878 A | | 5/1998 | Rees et al. ..................... 714/38 |

(List continued on next page.)

OTHER PUBLICATIONS

IBM Technical Disclosure Bulletin, "Process for Real Time, Trace Driven Performance Monitors," vol. No. 34, Issue No. 5, Oct. 1, 1991, pp. 415–417.*

(List continued on next page.)

Primary Examiner—Tuan Q. Dam
(74) Attorney, Agent, or Firm—Kelly K. Kordzik; Winstead Sechrest & Minick P.C.; Jeffrey S. LaBaw (57) ABSTRACT

The present invention is a system, method, and computer readable medium for representing program event trace information in a way which is very compact and efficient, and yet supports a wide variety of queries regarding system performance. The tracing and reduction of the present invention may be dynamic, in which case information is obtained and added to the trace representation in real-time. Alternately, the tracing and reduction may be static, in which case a trace text file or binary file is obtained from a trace buffer, and the reduction takes place using the trace file as input. The trace information, whether obtained statically or dynamically, is represented as a tree of events. The present invention may be used to present many types of trace information in a compact manner which supports performance queries. For example, the tree structure of the present invention may reflect the call stacks observed during a program's execution, and statistics regarding the memory allocated/deallocated in the various routines and call stacks may be stored at each node of the tree. The tree structure may be used to store performance information regarding Java bytecodes executed, memory allocated, or other types of performance information. The trace information is presented in a manner which is compact and efficient, and may be used to quickly and easily answer a variety of performance queries. Further, a system may be traced for long periods of time without losing useful performance information due to a limited buffer space.

30 Claims, 12 Drawing Sheets

U.S. PATENT DOCUMENTS

| | | | | |
|---|---|---|---|---|
| 5,768,500 | A | | 6/1998 | Agrawal et al. ............... 714/47 |
| 5,970,439 | A | * | 10/1999 | Levine et al. ................ 702/186 |
| 5,987,598 | A | * | 11/1999 | Levine et al. ................ 712/227 |
| 6,002,872 | A | * | 12/1999 | Alexander, III et al. ......... 717/4 |
| 6,055,492 | A | * | 4/2000 | Alexander, III et al. .... 702/179 |
| 6,230,313 | B1 | * | 5/2001 | Callahan, II et al. ........... 717/4 |

OTHER PUBLICATIONS

Morrisett et al., *Abstract Models of Memory Management*, sponsored in part by the Advanced Research Projects Agency (ARPA), CSTO, under the title "The Fox Project: Advanced Development of Systems Software," 1995, pp. 66–77.

Robert J. Hall et al., "Call Path Profiling of Monotonic Program Resources in UNIX", 1993 Summer USENIX, Jun. 21–25, 1993, Cincinnati, OH, 4 pp.

Glenn Ammons et al., "Exploiting Hardware Performance Counters with Flow and Context Sensitive Profiling", ACM, 1997, Las Vegas, NV, pp. 85–95.

Thomas Ball et al., "Optimally Profiling and Tracing Programs", ACM Transactions on Programming Languages and Systems, vol. 16, No. 4, , Jul. 1994, 1319–1360.

*IBM Technical Disclosure Bulletin*, "Implementation of High Performance Subtype Object Migration", vol. 38 No. 11, Nov. 1995, pp. 311–314.

* cited by examiner

FIG. 1

| Time | Event |
|------|-------|
| 0  | > C entered |
| 1  | > A entered |
| 2  | > B entered |
| 3  | < B returning |
| 4  | > B entered |
| 5  | > B entered |
| 6  | < B returning |
| 7  | < B returning |
| 8  | < A returning |
| 9  | > B entered |
| 10 | > A entered |
| 11 | > B entered |
| 12 | > A entered |
| 13 | < A returning |
| 14 | < B returning |
| 15 | > X entered |
| 16 | < X returning |
| 17 | < A returning |
| 18 | < B returning |
| 19 | < C returning |

FIG. 2

| Timestamp | Event | Call Stack After Event |
|---|---|---|
| 0 | enter C | C |
| 1 | enter A | CA |
| 2 | enter B | CAB |
| 3 | return from B | CA |
| 4 | enter B | CAB |
| 5 | enter B | CABB |
| 6 | return from B | CAB |
| 7 | return from B | CA |
| 8 | return from A | C |
| 9 | enter B | CB |
| 10 | enter A | CBA |
| 11 | enter B | CBAB |
| 12 | enter A | CBABA |
| 13 | return from A | CBAB |
| 14 | return from B | CBA |
| 15 | enter X | CBAX |
| 16 | return from X | CBA |
| 17 | return from A | CB |
| 18 | return from B | C |
| 19 | return from C | |

| Level (130) | RL (132) | Calls (134) | Base (136) | Cum (138) | Indent (140) |
|---|---|---|---|---|---|
| 0 | 1 | 1 | 0 | 19 | pt_pidtid |
| 0 | 1 | 1 | 3 | 19 | -C |
| 1 | 1 | 1 | 3 | 7 | --A |
| 3 | 1 | 2 | 3 | 4 | ---B |
| 4 | 2 | 1 | 1 | 1 | ----B |
| 2 | 1 | 1 | 2 | 9 | --B |
| 3 | 1 | 1 | 3 | 7 | ---A |
| 4 | 2 | 1 | 2 | 3 | ----B |
| 5 | 2 | 1 | 1 | 1 | -----A |
| 4 | 1 | 1 | 1 | 1 | ----X |

FIG. 8

| Calls (190) | Base (192) | Cum (194) | Cum2 (196) | Ind (198) | Name (200) |
|---|---|---|---|---|---|
| 1 | 0 | 19 | 0 | 0 | pt_pidtid |
| 1 | 3 | 19 | 0 | 1 | C |
| 3 | 7 | 14 | 15 | 2 | A |
| 5 | 8 | 13 | 17 | 3 | B |
| 1 | 1 | 1 | 0 | 4 | X |

ArcFlow Output
   Base - Time/Instructions directly in function
   Cum - Time/Instructions directly & indirectly in function ArcFlow Invarients:
   1) Sum (Parent (Calls)) = Self (Calls)
   2) Sum (Parent (Base)) = Self (Base)
   3) Sum (Parent (Cum)) = Self (Cum)
   4) Sum (Child (Cum)) = Self (Cum) - Self (Base)

| Source | Calls | Base | Cum | Function |
|---|---|---|---|---|
| Self | 1 | 0 | 19 | [0] pt_pidtid |
| Child | 1 | 3 | 19 | C |
| Parent | 1 | 3 | 19 | pt_pidtid |
| Self | 1 | 3 | 19 | [1] C |
| Child | 1 | 2 | 9 | B |
| Child | 1 | 3 | 7 | A |
| Parent | 1 | 3 | 7 | C |
| Parent | 1 | 3 | 7 | B |
| rParent | 1 | 1 | 1 | B |
| Self | 3 | 7 | 14 | [2] A |
|  |  |  | 15 |  |
| Child | 3 | 5 | 7 | B |
| Child | 1 | 1 | 1 | X |

A        A

A ---------------------------------------------------------------- A

| | | | | |
|---|---|---|---|---|
| Parent | 2 | 3 | 4 | A |
| rParent | 1 | 2 | 3 | A |
| Parent | 1 | 2 | 9 | C |
| Self | 5 | 8 | 13 | [3] B |
| | | | 17 | |
| Child | 1 | 3 | 7 | A |
| rChild | 1 | 1 | 1 | A |
| Child | 1 | 1 | 1 | B |
| Parent | 1 | 1 | 1 | A |
| Self | 1 | 1 | 1 | [4] X |

FIG. 12

SYSTEM AND METHOD FOR PROVIDING TRACE INFORMATION

CROSS-REFERENCE TO RELATED APPLICATION

The present Application continuation-in-part of U.S. patent application Ser. No. 08/989,725 now filed Dec. 12, 1997 U.S. Pat. No. 6,055,492.

TECHNICAL FIELD

The present invention relates to information processing systems and, more particularly, to software tools and methods for monitoring, modeling, and enhancing system performance.

BACKGROUND INFORMATION

To enhance system performance, it is helpful to know which modules within a system are responsible, either directly or indirectly, for the most significant consumption of the most critical system resources. Effective systems management depends on knowing how and when system resources are being used. Similarly, a developer hoping to improve system performance should focus his or her efforts on improving the resource consumption characteristics of the modules which consume the largest amount of critical resources.

Performance tools are used to examine the system in order to determine resource consumption as programs execute. For example, a performance tool may identify the most frequently executed modules and instructions in a system, or may identify those modules which allocate the largest amount of memory or perform the most I/O requests. Performance tools may be implemented in hardware or software. Software performance tools may be built into the system or added at a later point in time. Performance tools implemented in software are especially usefull in systems, such as personal computer systems, that do not contain many, if any, built-in hardware performance tools. Software tools take advantage of hardware performance tools and are instrumental in understanding what is happening at the level that an analyst or program developer can understand.

One type of prior art software performance tool, referred to as a trace tool, keeps track of particular sequences of instructions by logging certain events as they occur. For example, a trace tool may log every entry into and every exit from a module, subroutine, method, function, or system component. Typically, a time stamped record is produced for each such event. Pairs of records similar to entry-exit records are also used to trace execution of arbitrary code segments, to record acquiring and releasing locks, starting and completing I/O or data transmission, and for many other events of interest.

Figure 1:
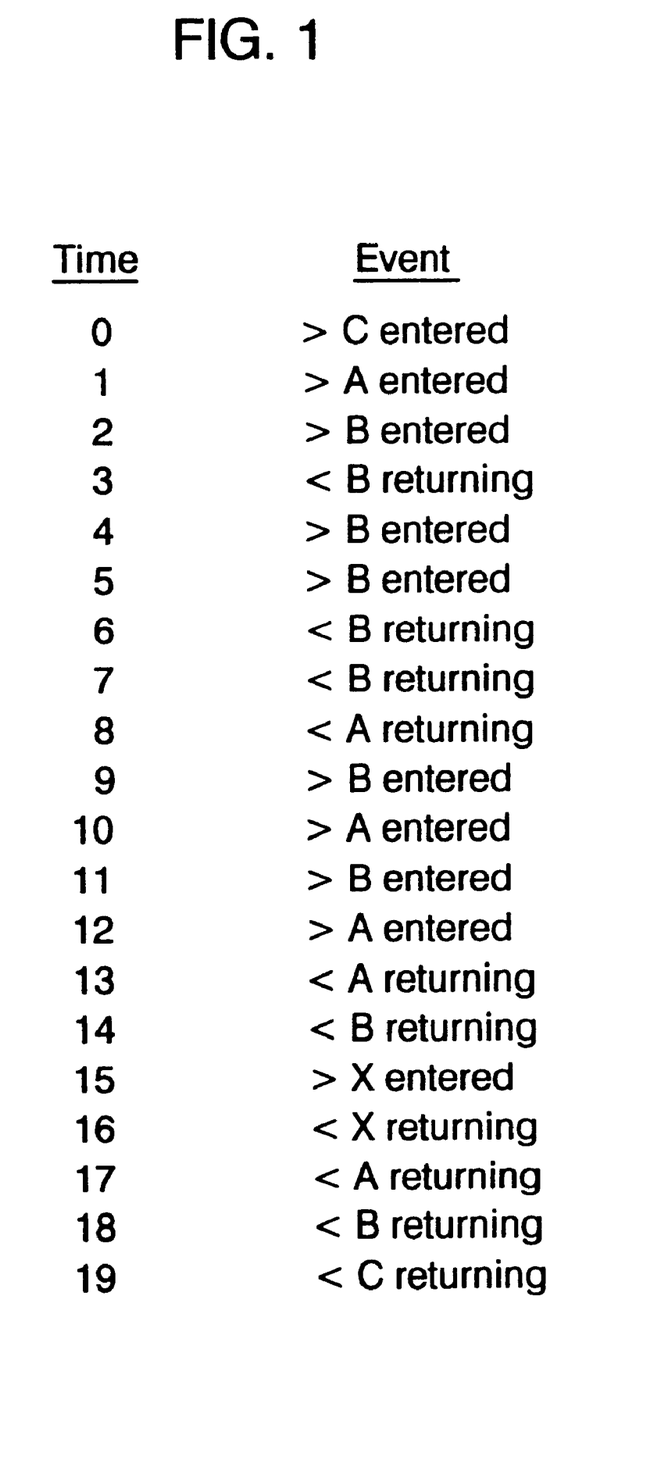
FIG. 1 is an illustration of a portion of a text file trace output.

A developer or systems manager is typically presented with a "trace" of the results. The trace is often stored as a text file, such as the example trace, showing entries into and exits from modules, depicted in FIG. 1. The trace in FIG. 1 shows that module "C" is the first module entered. Module "C" calls module "A," module "A" calls module "B," and so on.

FIG. 1 depicts a very small piece of a larger trace. Typically, traces are many millions of entries long. Because loops are common in programs, trace files often contain patterns of events repeated many times. The typical text file trace output may be read by a developer or systems manager, and is adequate for gaining an understanding of very small time periods within the trace. However, a text file trace output is too cumbersome to use when attempting to analyze large scale behavior and patterns contained in a trace. Furthermore, the size of the trace is limited by the buffer space allocated to store the trace. Thus, a system may be traced for a limited, and often very short, period of time.

Consequently, it would be desirable to have a system and method for providing trace information to a developer or systems manager in a compact and highly efficient manner. It would also be desirable to provide the trace information in such a way as to facilitate understanding of the system's operation, and highlight opportunities for performance improvement.

SUMMARY OF THE INVENTION

Accordingly, the present invention is directed to a system, method, and computer readable medium for representing program event trace information in a way which is very compact and efficient, and yet supports a wide variety of queries regarding system performance. The tracing and reduction of the present invention may be dynamic, in which case information is obtained in real-time, as each event occurs, and is automatically reduced and added to the trace representation. Alternately, the tracing and reduction of the present invention may be static, in which case a trace text file or binary file is obtained from a trace buffer, and the reduction takes place using the trace file as input.

The trace information, whether obtained statically or dynamically, is represented as a tree of events. For example, the tree structure of the present invention may reflect the call stacks observed during a program's execution. A call stack is represented by one or more nodes in the tree, and statistics regarding the time spent in the various routines and call stacks is stored at each node.

The present invention may be used to present many types of trace information in a compact manner which supports performance queries. For example, rather than keeping statistics regarding time, tracing may be used to track the number of Java bytecodes executed in each method (i.e. routine) called. The tree structure of the present invention would then contain statistics regarding bytecodes executed. Tracing may also be used to track memory allocation and deallocation. An advantage of this invention is that it is not required to store a trace record for every memory allocation or deallocation, though such an approach is possible under the present invention.

An advantage of the present invention is that trace information is presented in a manner which is compact and efficient. Another advantage is that the tree structure of the present invention may be used to quickly and easily answer a variety of performance queries. A further advantage of the present invention is that it allows a system to be traced for long periods of time without losing useful performance information due to a limited buffer space. The use of dynamic tracing and reduction, along with dynamic pruning in some cases, is especially usefull in profiling the performance characteristics of long running programs. By using dynamic tracing and reduction (and perhaps dynamic pruning), an accurate and informative performance profile may be obtained for a long running program.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF THE INVENTION

Figure 2:
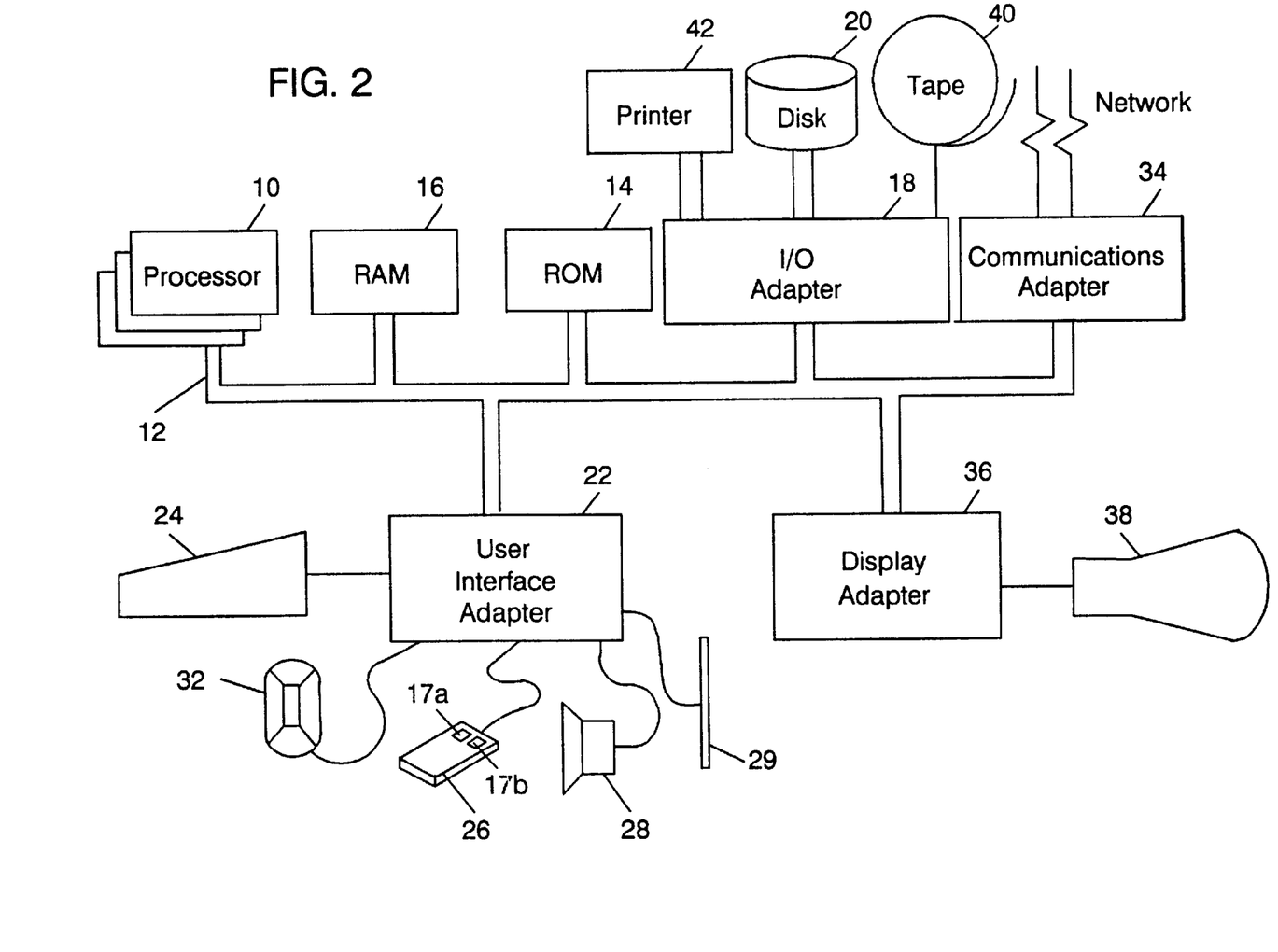
FIG. 2 is a block diagram of an information handling system capable of executing the performance monitoring and reduction method of the present invention.

The invention may be implemented on a variety of hardware platforms, including personal computers, workstations, mini-computers, and mainframe computers. Many of the steps of the method according to the present invention may be advantageously implemented on parallel processors of various types. Referring now to FIG. 2, a typical configuration of an information handling system that may be used to practice the novel method of the present invention will be described. The computer system of FIG. 2 has at least one processor 10. Processor 10 is interconnected via system bus 12 to random access memory (RAM) 16, read only memory (ROM) 14, and input/output (I/O) adapter 18 for connecting peripheral devices such as disk units 20, tape drives 40, and printers 42 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38.

Communication adaptor 34 may link the system depicted in FIG. 2 with hundreds or even thousands of similar systems, or other devices, such as remote printers, remote servers, or remote storage units. The system depicted in FIG. 2 may be linked to both local area networks (sometimes referred to as intranets) and wide area networks, such as the Internet.

The present invention is a system, method, and computer readable medium for representing program event trace information in a way which is very compact and efficient, and yet supports a wide variety of queries regarding system performance. The trace information may be obtained in real-time, as each event occurs, and be automatically reduced and added to the trace representation. This type of tracing and reduction is referred to as dynamic tracing and reduction. Alternately, the trace may be a trace text file or binary file obtained from a trace buffer, and the reduction takes place using the trace file as input. This type of tracing and reduction is referred to as static tracing and reduction.

The trace information, whether obtained statically or dynamically, is represented as a tree of events. For example, the trace data may be represented as a tree, where the tree reflects the call stacks observed during execution. A call stack is an ordered list of routines (i.e. modules, functions, methods, etc.) that have been entered, but not yet exited, at any given moment during the execution of a program. For example, if routine A calls routine B, and then routine B calls routine C, while the processor is executing instructions in routine C, the call stack is ABC. When control returns from routine C back to routine B, the call stack is AB.

Figure 3:
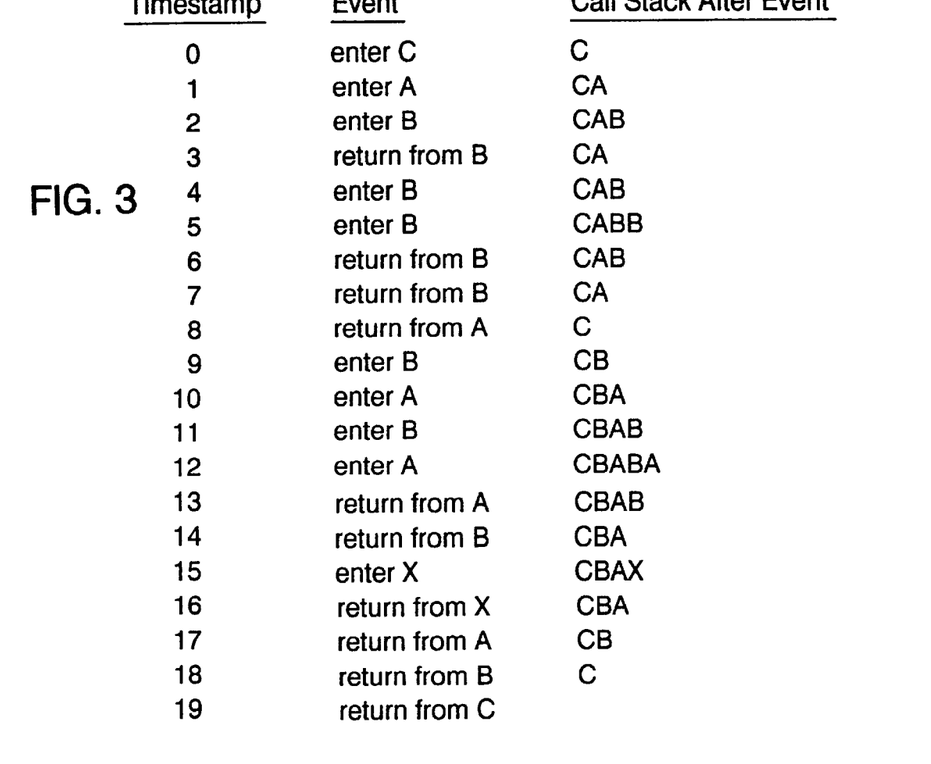
FIG. 3 is an illustration of a trace sequence, along with a representation of the call stack associated with the trace sequence.

FIG. 3 illustrates a portion of a trace sequence, along with the state of the call stack after each trace event. Note that the trace sequence depicted in FIG. 3 may be static information contained in a trace text file. The trace text file is created based on information contained in a trace buffer, and is often created after tracing has been turned off. Alternately, the trace information in FIG. 3 may be dynamically obtained. In this case, the information shown in FIG. 3 is acted upon as the information is obtained, i.e. as each event occurs. Also note that the trace sequence depicted in FIG. 3 uses integral time stamps (i.e. time 0, time 1, time 2, etc.). The use of integral time stamps is for illustrative purposes only.

Still referring to FIG. 3, note that at time 0, routine C is entered. The call stack at time 0 is thus C. At time 1, routine C calls routine A, and the call stack becomes CA, and so on. The present invention represents the system events, in this case call stacks, in a compact and informative manner, as depicted in FIG. 4.

Figure 4:
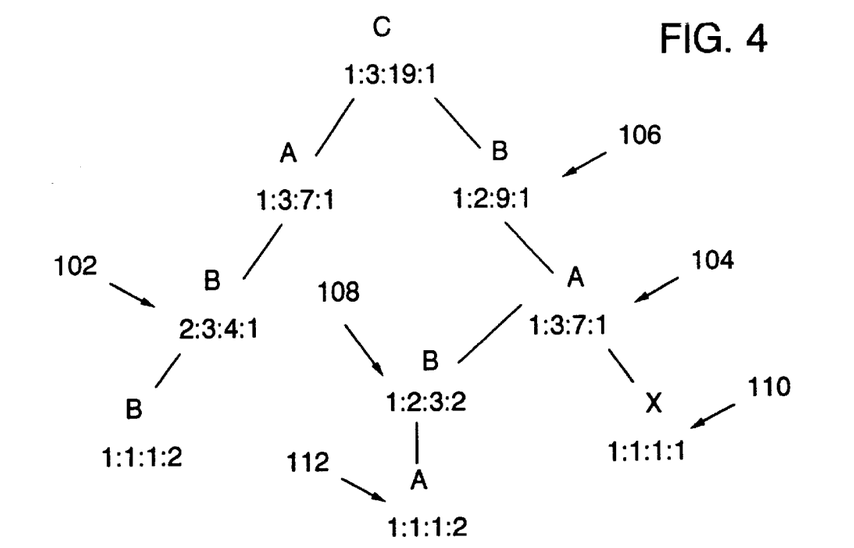
FIG. 4 is a pictorial representation of a call stack tree, which may be presented to a user.

Referring now to FIG. 4, an event tree which reflects call stacks observed during system execution will now be described. At each node in the tree, several statistics are recorded. In the example shown in FIG. 4, the statistics are time-based statistics. The particular statistics shown include the number of distinct times the call stack is produced, the sum of the time spent in the call stack, the total time spent in the call stack plus the time in those call stacks invoked from this call stack (referred to as cumulative time), and the number of instances of this routine above this instance (indicating depth of recursion).

For example, at node 102 in FIG. 4, the call stack is CAB, and the statistics kept for this node are 2:3:4:1. Note that call stack CAB is first produced at time 2 in FIG. 3, and is exited at time 3. Call stack CAB is produced again at time 4, and is exited at time 7. Thus, the first statistic indicates that this particular call stack, CAB, is produced twice in the trace. The second statistic indicates that call stack CAB exists for three units of time (at time 2, time 4, and time 6). The third statistic indicates the cumulative amount of time spent in call stack CAB and those call stacks invoked from call stack CAB (i.e. those call stacks having CAB as a prefix, in this case CABB) The cumulative time in the example shown in FIG. 4 is four units of time. Finally, the recursion depth of call stack CAB is one, as none of the three routines present in the call stack have been recursively entered.

Those skilled in the art will appreciate that the tree structure depicted in FIG. 4 may be implemented in a variety of ways, and a variety of different types of statistics may be maintained at each node. In the described embodiment, each node in the tree contains data and pointers. The data include the name of the routine at that node, and the four statistics discussed above. Of course, many other types of statistical information may be stored at each node. In the described embodiment, the pointers for each node include a pointer to the node's parent, a pointer to the first child of the node (i.e. the left-most child), a pointer to the next sibling of the node, and a pointer to the next instance of a given routine in the tree. For example, in FIG. 4, node 104 would contain a parent pointer to node 106, a first child pointer to node 108, a next sibling pointer equal to NULL (note that node 104 does not have a next sibling), and a next instance pointer to node 112. Those skilled in the art will appreciate that other pointers may be stored to make subsequent analysis more efficient. In addition, other structural elements, such as tables for the properties of a routine that are invariant across instances (e.g., the routine's name), may also be stored.

Figure 5:
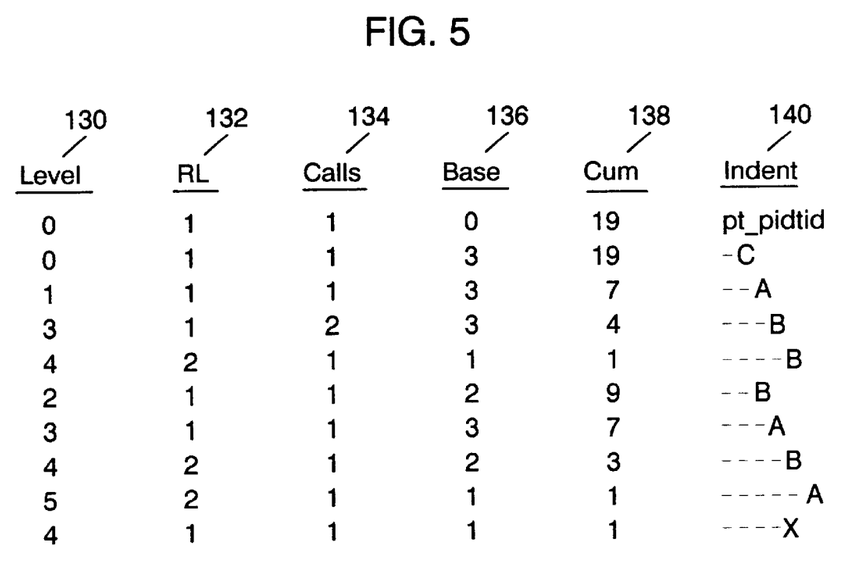
FIG. 5 illustrates another manner in which the call stack tree of FIG. 4 may be presented to the user.

The tree structure shown in FIG. 4 depicts one way in which data may be pictorially presented to a user. The same data may also be presented to a user in tabular form as shown in FIG. 5. Referring now to FIG. 5, a call stack tree presented as a table will now be described. Note that FIG. 5 contains a routine, pt_pidtid, which is the main process/thread which calls routine C. Table 5 includes columns of data for Level 130, RL 132, Calls 134, Base 136, Cum 138, and Indent 140. Level 130 is the tree level (counting from the root as level 0) of the node. RL 132 is the recursion level, Calls 134 is the number of occurrences of this particular call stack (i.e. the number of times this call stack occurs). Base 136 is the total observed time in the particular call stack. Cum 138 is the total time in the particular call stack plus deeper levels. Indent 140 depicts the level of the tree in an indented manner.

Figure 6A:
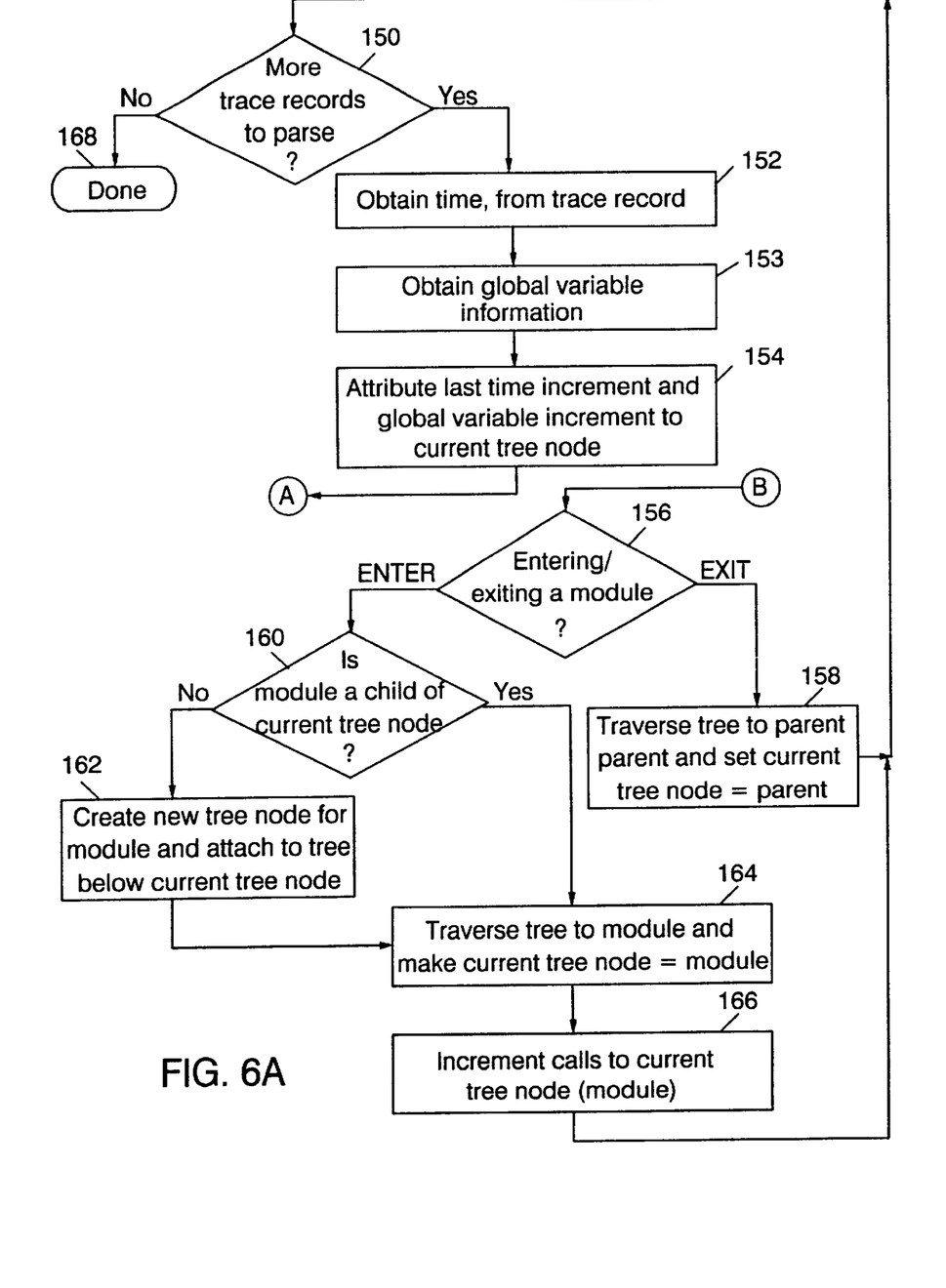
FIGS. 6A and 6B, 6C are a flow chart depicting a method for creating a call stack tree from a trace history file, according to the teachings of the present invention.
Figure 6B:
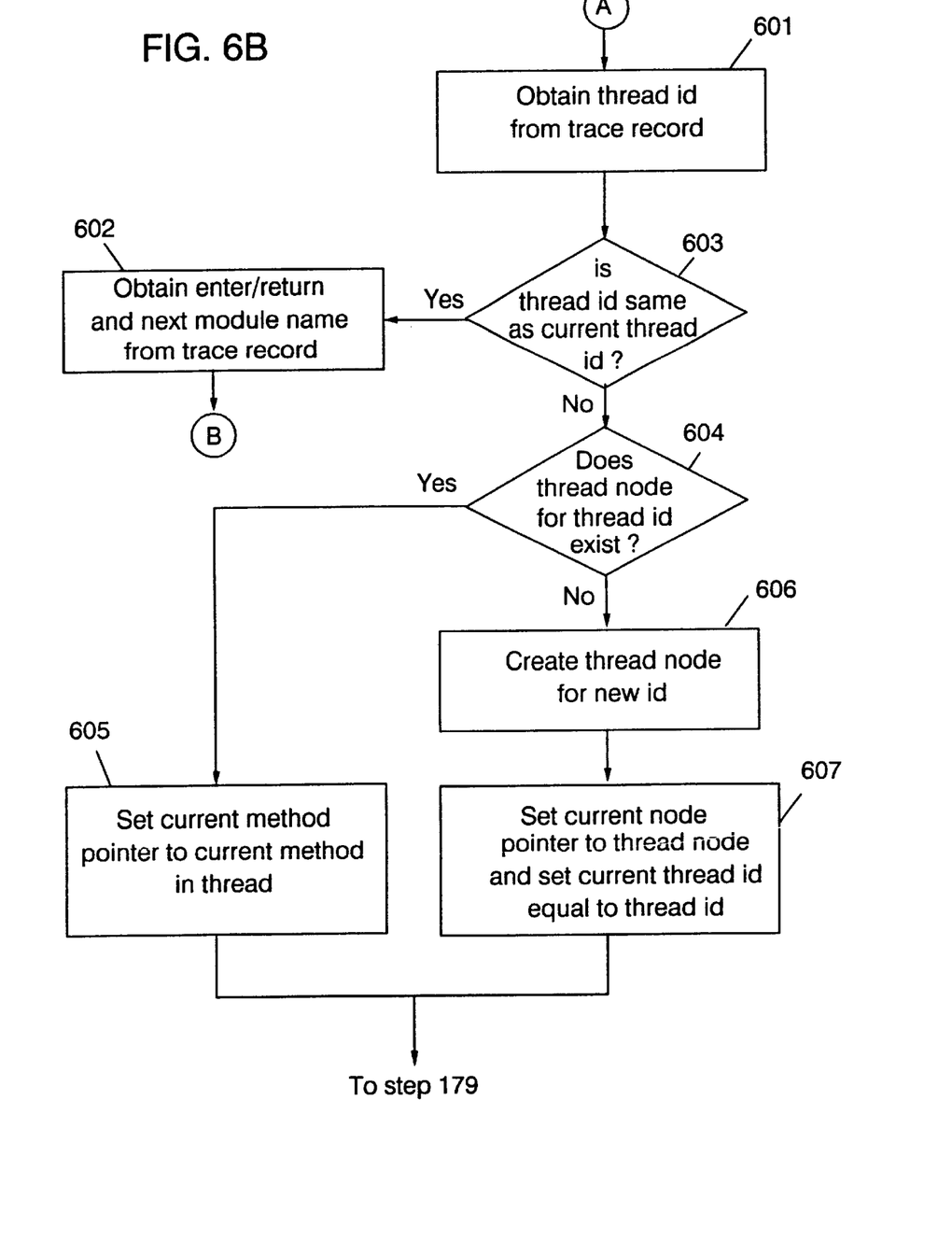
Figure 6C:
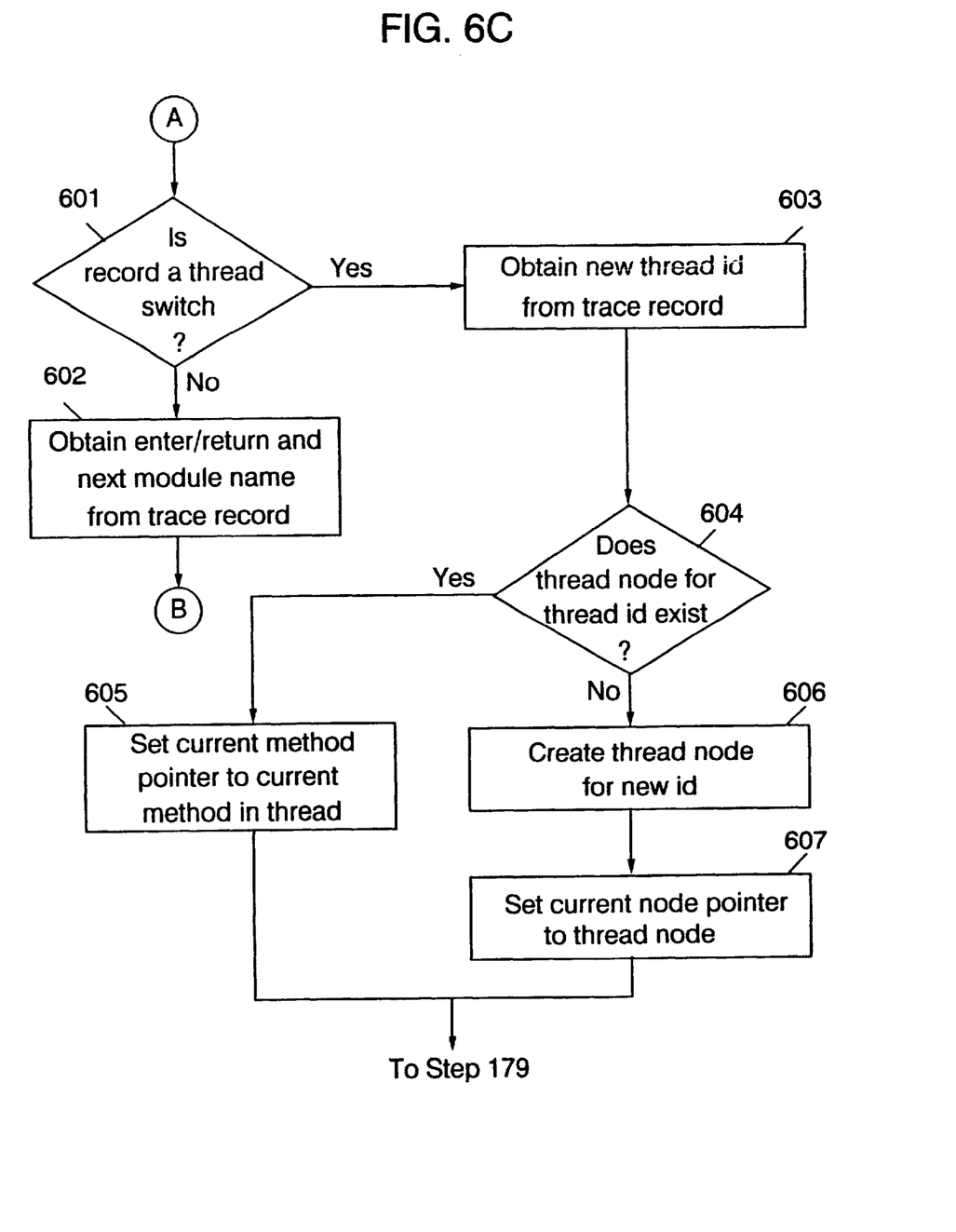

Both the pictorial view of the call stack tree, as illustrated in FIG. 4, and the tabular view of the call stack tree, as illustrated in FIG. 5, may be built dynamically, or built using a trace text file or binary file as input. FIG. 6 (FIGS. 6A and 6B) is a flow chart depicting a method for building a call stack tree using a trace text file as input. In FIG. 6, the call stack tree is being built to illustrate module entry and exit points.

Figures 7A, 7B:
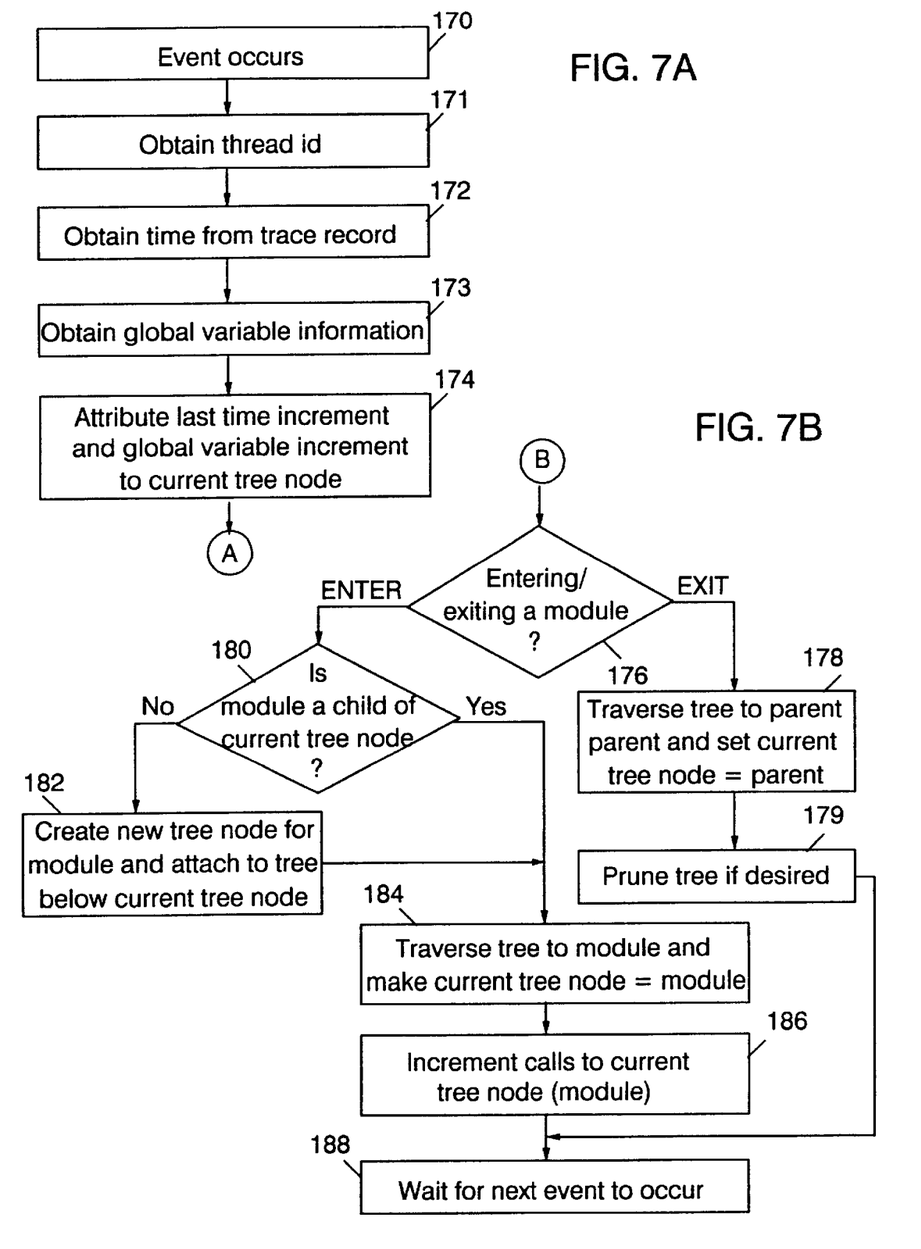
FIGS. 7A and 7B are a flow chart depicting a method for creating a call stack tree in real time, from a dynamic trace sequence, according to the teachings of the present invention.

Referring now to FIG. 6, it is first determined if there are more trace records in the trace text file (step 150). If so, time data is obtained from the trace record (step 152). In step 153, global variable information is obtained from where the global variable is being maintained. Next, the last time increment and the global variable increment are attributed to the current node in the tree (step 154). In step 601, the new thread ID is obtained from the trace record. Thereafter, in step 603, a determination is made whether the record indicates a thread switch by determining if the new thread ID is the same as the current thread ID. If yes, the process proceeds to step 602 to obtain enter/return and next module name from the trace record. The process will then return to step 156. If in step 603, the record indicates a thread switch, then the process proceeds to step 604. In step 604, a determination is made whether a thread node for the thread ID exists. If yes, the process proceeds to step 605 to set the current method pointer to the current method in the thread. If no, the process proceeds to step 606 to create the thread node for the new ID, and then in step 607, the current node pointer is set to the thread node and the current thread ID is set equal to the new thread ID. Steps 605 and 607 then proceed to step 179 in FIG. 7.

A check is made to determine if the trace record is an enter or an exit record (step 156). If it is an exit record, the tree is traversed to the parent (using the parent pointer), and the current tree node is set equal to the parent node (step 158). If the trace record is an enter record, a check is made to determine if the module is already a child node of the current tree node (step 160). If not, a new node is created for the module and it is attached to the tree below the current tree node (step 162). The tree is then traversed to the module's node, and the current tree node is set equal to the module node (step 164). The number of calls to the current tree node is then incremented (step 166). This process is repeated for each trace record in the trace output file, until there are no more trace records to parse (step 168).

FIG. 7 is a flow chart depicting a method for building a call stack tree dynamically, as tracing is taking place during system execution. In FIG. 7, as an event is logged, it is added to the tree in real time. Preferably, a call stack tree is maintained for each thread. The call stack tree reflects the call stacks recorded to date, and a current tree node field indicates the current location in a particular tree. When an event occurs (step 170), the thread ID is obtained (step 171). The time is then obtained (step 172). In step 173, global variable information is obtained from where the global variable is being maintained. The last time increment and the global variable increment are attributed to the current tree node (step 174). Next, steps 601–607 are then performed as described above.

A check is made to determine if the trace event is an enter or an exit event (step 176). If it is an exit event, the tree is traversed to the parent (using the parent pointer), and the current tree node is set equal to the parent node (step 178). At this point, the tree can be dynamically pruned in order to reduce the amount of memory dedicated to its maintenance (step 179). Pruning is discussed in more detail below. If the trace event is an enter event, a check is made to determine if the module is already a child node of the current tree node (step 180). If not, a new node is created for the module and it is attached to the tree below the current tree node (step 182). The tree is then traversed to the module's node, and the current tree node is set equal to the module node (step 184). The number of calls to the current tree node is then incremented (step 186). Control is then passed back to the executing module, and the dynamic tracing/reduction program waits for the next event to occur (step 188).

One of the advantages of using the dynamic tracing/reduction technique described in FIG. 7 is its enablement of long-term system trace collection with a finite memory buffer. Very detailed performance profiles may be obtained without the expense of an "infinite" trace buffer. Coupled with dynamic pruning, the method depicted in FIG. 7 can support a fixed-buffer-size trace mechanism.

The use of dynamic tracing and reduction (and dynamic pruning in some cases) is especially usefull in profiling the performance characteristics of long running programs. In the case of long running programs, a finite trace buffer can severely impact the amount of useful trace information which may be collected and analyzed. By using dynamic tracing and reduction (and perhaps dynamic pruning), an accurate and informative performance profile may be obtained for a long running program. Dynamic pruning is not required to use the method of the present invention. Many long-running applications reach a type of steady-state, where every possible routine and call stack is present in the tree, and the dynamic data reduction becomes a matter of walking the tree and updating statistics. Thus, trace data can be recorded and stored for such applications indefinitely within the constraints of a bounded memory requirement. Pruning has value in reducing the memory requirement for those situations in which the call stacks are actually unbounded. For example, unbounded call stacks are produced by applications that load and run other applications.

Pruning can be performed in many ways, and a variety of pruning criteria are possible. For example, pruning decisions may be based on the amount of cumulative time attributed to a subtree. Note that pruning may be disabled unless the amount of memory dedicated to maintaining the call stack exceeds some limit. As an exit event is encountered (such as step 178 in FIG. 7), the cumulative time associated with the current node is compared with the cumulative time associated with the parent node. If the ratio of these two cumulative times does not exceed a pruning threshold (e.g., 0.1), then the current node and all of its descendants are removed from the tree. The algorithm to build the tree proceeds as before by traversing to the parent, and changing the current node to the parent.

Many variations of the above pruning mechanism are possible. For example, the pruning threshold can be raised or lowered to regulate the level of pruning from very aggressive to none. More global techniques are also possible, including a periodic sweep of the entire call stack tree, removing all subtrees whose individual cumulative times are not a significant fraction of their parent node's cumulative times.

The performance data reduction of the present invention allows analysis programs to easily and quickly answer many questions regarding how computing time was spent within the traced program. Examples of questions that can be answered using the call stack tree depicted in FIGS. 4 and 5, include questions such as the following:

1. How much time was spent in routine A?
2. How much time was spent in routine A and in routines called, either directly or indirectly, by A?
3. Of all the time spent in A, how much time was when A was called, either directly or indirectly, by B?
4. Of A's cumulative time, how much was spent in B and routines B called, either directly or indirectly?
5. List all the routines that called A directly, and break out A's time under each of them.
6. List all the routines A called directly and apportion A's cumulative time among them.

Those skilled in the art will appreciate that the answers to the above example questions, and many other questions, may be answered by "walking the tree" and accumulating the data stored at various nodes within the call stack tree.

Figure 8:
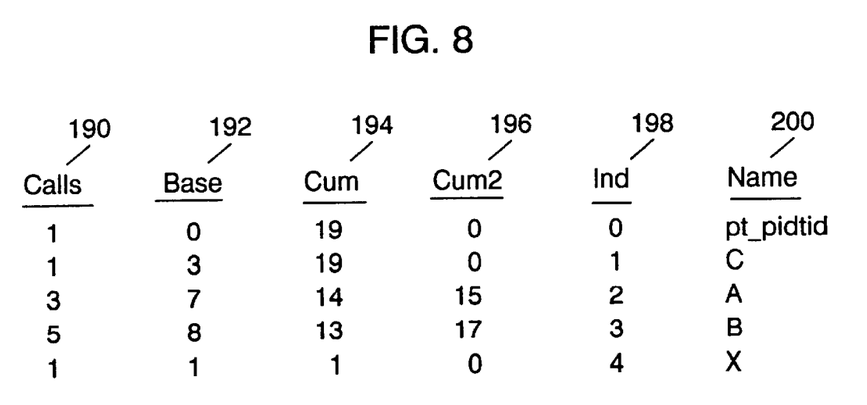
FIG. 8 illustrates several statistics regarding the call stack tree as they may be presented to the user.
Figure 9A:
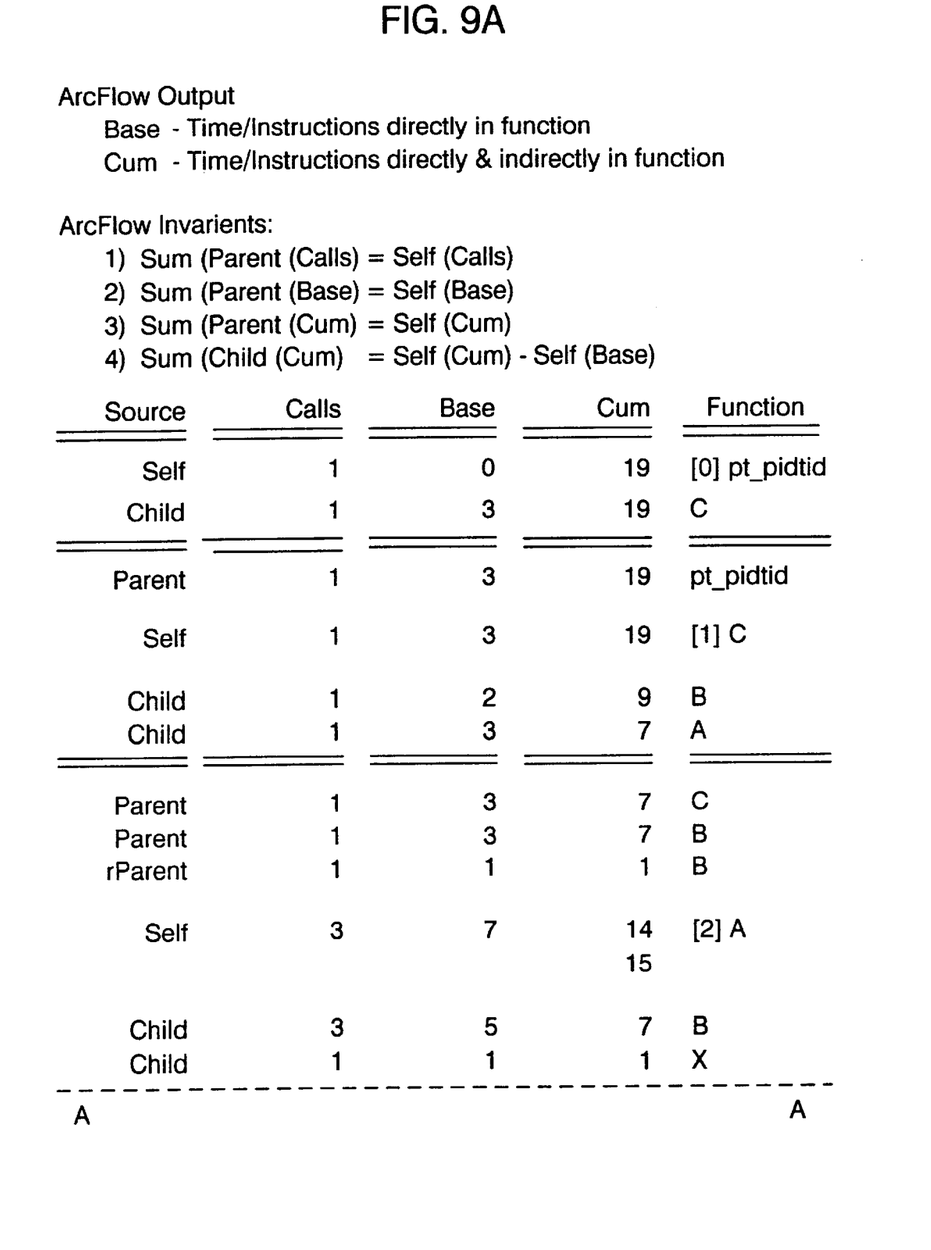
FIGS. 9A and 9B illustrate another manner in which call stack tree statistics may be presented to the user.
Figure 9B:
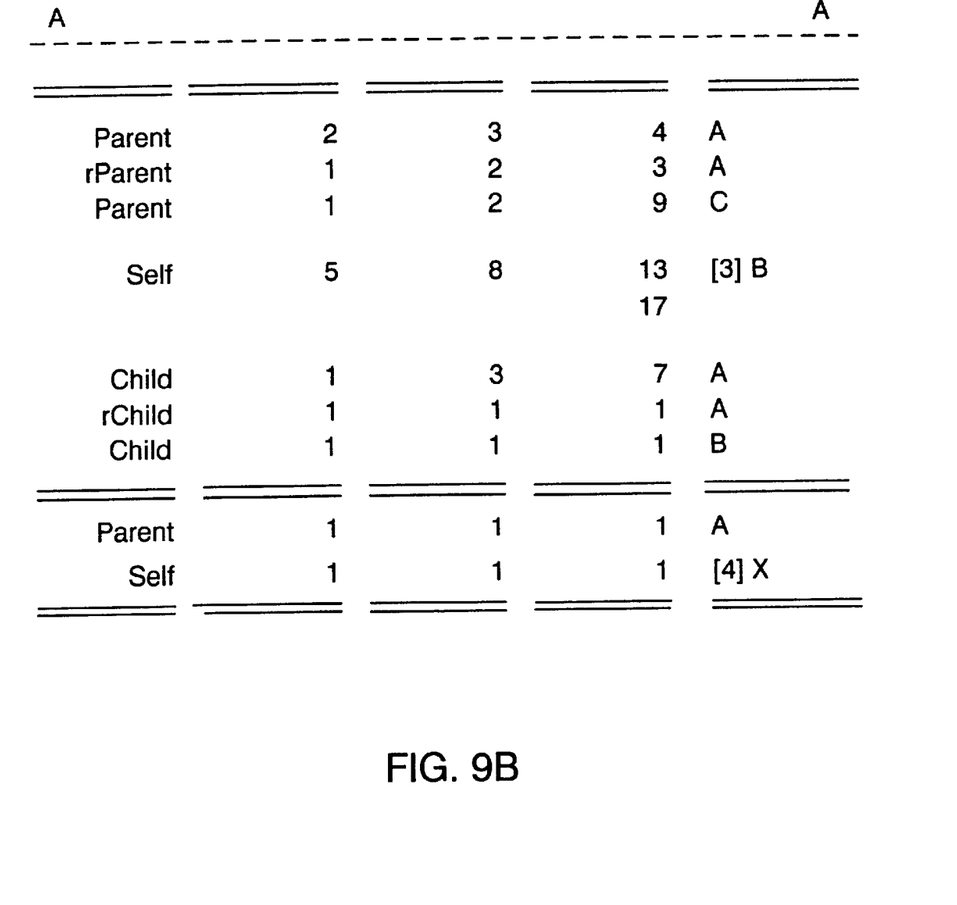

FIGS. 8 and 9 depict two different types of reports which may be produced based on the call stack tree depicted in FIGS. 4 and 5. In FIG. 8, each routine is listed separately, along with information regarding the routine. For example, Calls 190 lists the number of times each routine has been called. Base 192 is the total time spent in the routine. Cum 194 is the cumulative time spent in the routine and all routines called by the routine. Cum2 196 is the cumulative time plus time spent in recursive routines. Ind 198 is an index number generated to make it easier for an analyst to relate entries in the different output tables. Name 200 is the name of the routine. FIG. 9A and 9B depict much of the same information shown in FIG. 8, although in a slightly different format.

The type of performance information and statistics maintained at each node are not constrained to time-based performance statistics. The present invention may be used to present many types of trace information in a compact manner which supports performance queries. For example, rather than keeping statistics regarding time, tracing may be used to track the number of Java bytecodes executed in each method (i.e., routine) called. The tree structure of the present invention would then contain statistics regarding bytecodes executed, rather than time. In particular, the quantities recorded in the second and third categories would reflect the number of bytecodes executed, rather than the amount of time spent in each method.

Tracing may also be used to track memory allocation and deallocation. Every time a routine creates an object, a trace record could be generated in one implementation. In another implementation, individual trace records are not stored for each memory allocation or deallocation. The tree structure of the present invention would then be used to efficiently store and retrieve information regarding memory allocation. Each node would represent the number of method calls, the amount of memory allocated within a method, the amount of memory allocated by methods called by the method, and the number of methods above this instance (i.e., the measure of recursion). Those skilled in the art will appreciate that the tree structure of the present invention may be used to represent a variety of performance data in a manner which is very compact, and allows a wide variety of performance queries to be performed.

Figures 10, 11:
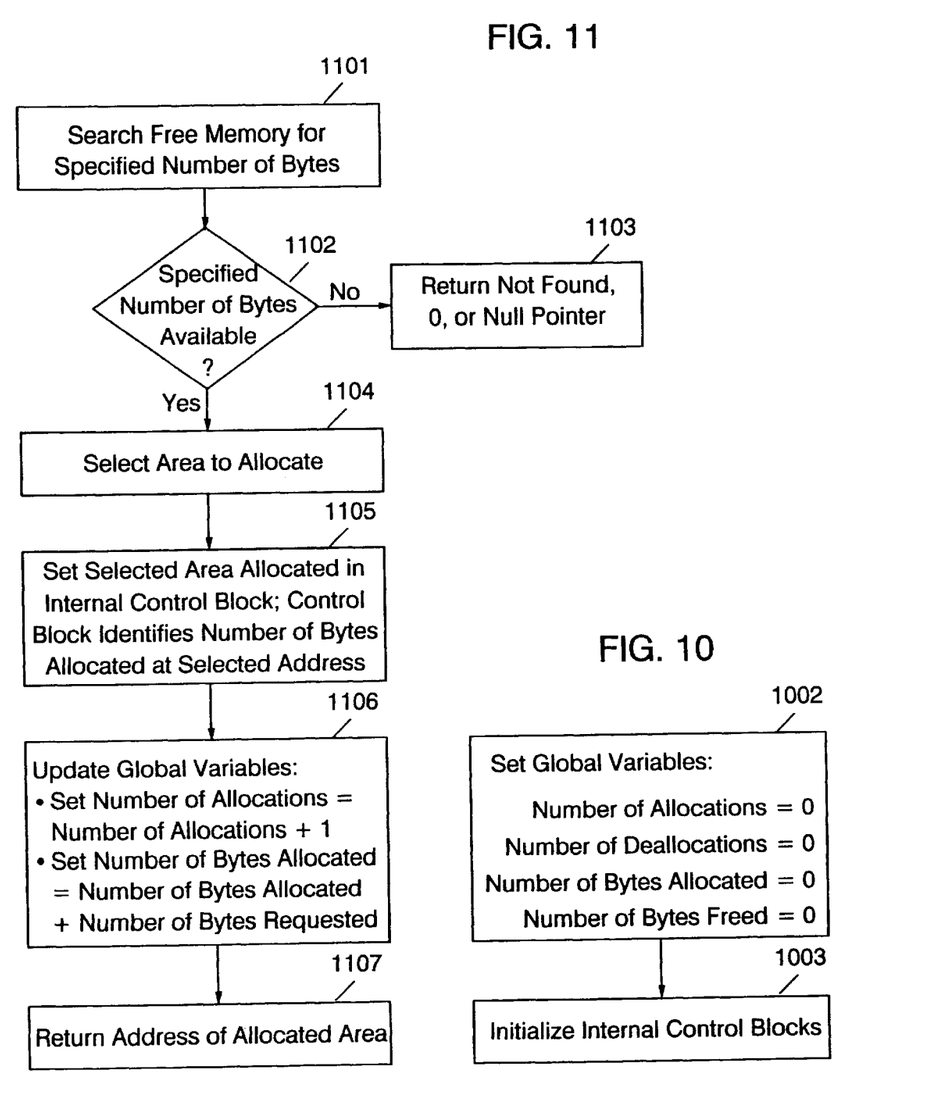
FIG. 10 illustrates a process for initializing global variables.
FIG. 11 illustrates a process for tracking memory allocations.
Figure 12:
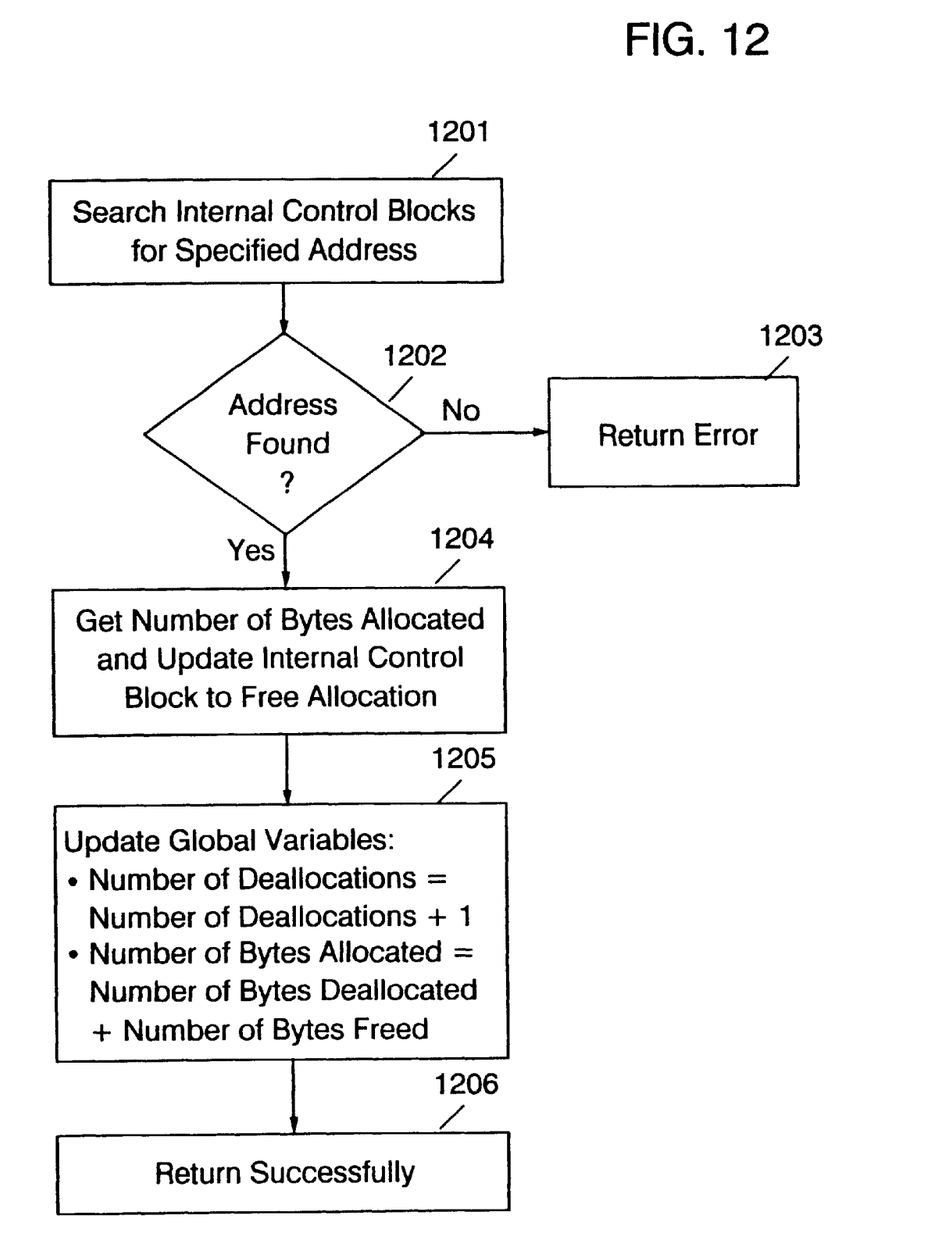
FIG. 12 illustrates a process for tracking memory deallocations.

FIGS. 10–12 illustrate an embodiment in accordance with the present invention for tracking memory allocation and deallocation. In FIG. 10, the global variables used within the present invention are initialized. In step 1002, the following variables are initialized to zero: number of memory allocations, number of memory deallocations, number of bytes allocated, and number of bytes freed. Thereafter, in step 1003, the internal control blocks are initialized. The memory allocation routines already in the system, including the C runtime library, initialize their internal data structures, which contains information, such as how much free memory is available, and typically for each allocation, the start address and length.

Memory allocations and deallocations are performed independent to method entries and exits. During execution of a method, additional memory may be required. In the case of Java objects, memory is allocated from the heap, for example, by the statement string S1=new string ("ABC").

FIG. 11 illustrates a flow diagram for tracking memory allocation in accordance with the present invention. In step 1101, when a memory allocation is performed, the process begins in step 1101 to search free memory for a specified number of bytes needed by the method. In step 1102, a determination is made whether the specified number of bytes are available. If not, then in step 1103, a zero, null, or not found message is returned. However, if the specified number of bytes are available in step 1102, the process proceeds to step 1104 to select the memory area to allocate. Thereafter, in step 1105, the selected area allocated is set in the internal control block. The control block identifies the number of bytes allocated at the selected address. Then, in step 1106, the global variables are updated. The number of allocations variable is set equal to the previous number of allocations plus one, while the number of bytes allocated variable is set equal to the previous number of bytes allocated plus the number of bytes requested. In step 1107, the address of the allocated area is returned.

FIG. 12 illustrates a process for tracking memory deallocation. In step 1201, the internal control blocks are searched for the specified address. In step 1202, it is determined whether the address has been found. If not, an error is returned in step 1203. However, if the address is found in step 1202, then in step 1204 the number of bytes allocated when the method was previously entered is obtained and the internal control block is updated to free the allocation.

Thereafter, in step 1205, the global variables are updated. The number of deallocations variable is set equal to the previous number of deallocations plus one, while the number of bytes deallocated is set equal to the previous number of bytes deallocated plus the number of bytes freed. Thereafter, in step 1206, a success indicator is returned.

The present invention described above with respect to FIGS. 10–12 extends the concepts described previously in FIGS. 1–9B to the concept of tracking memory allocation and deallocation. Additionally, the memory allocation information and/or time information may be written or made available at the time of a task switch. The information can be gathered at the time of the task switch if all memory allocations/deallocations are written. Whenever there is a task switch, a task switch hook is written. One approach is to write the current allocation information at the time of the task switch. This allows the direct support of the information to be applied to the current thread, which in turn applies to the routine currently executing.

The usage of global variables allows data to be maintained by one routine and used by any other routines that need the information. An alternative approach in the object-oriented paradigm is to have one routine/class that works with the variables and that provides methods to access the required information data. In an operating system that is simply maintained as one image or in a single module environment, global variables that are maintained by one routine and accessed for read-only access by others is efficient.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 16 of one or more computer systems configured generally as described in FIG. 2. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for monitoring the performance of a program, comprising the steps of:
   obtaining a plurality of trace events which occur as the program executes;
   representing the trace events as one or more nodes in a tree structure; and
   recording one or more performance statistics at each node in the tree structure,
   wherein the one or more performance statistics include tracking memory allocation/deallocation.

2. The method according to claim 1, wherein the one or more performance statistics include recording a number of times memory is allocated during the performance of the program.

3. The method according to claim 1, wherein the one or more performance statistics include recording a number of times memory is deallocated during the performance of the program.

4. The method according to claim 1, wherein the one or more performance statistics include recording a number of bytes of memory allocated during the performance of the program.

5. The method according to claim 1, wherein the one or more performance statistics include recording a number of bytes of memory deallocated during the performance of the program.

6. The method according to claim 1, wherein the recording step further comprises the steps of:
   searching free memory for a specified number of bytes;
   determining if the specified number of bytes are available;
   if the specified number of bytes are available in free memory, selecting the specified area in memory to allocate; and
   incrementing a number of allocations, and incrementing a number of bytes allocated by the number of bytes specified.

7. The method according to claim 1, wherein the recording step further comprises the steps of:
   searching internal control blocks for a specified address;
   determining if the address has been found;
   if the address has been found, getting a number of bytes allocated and updating the internal control block to free allocation of the bytes; and
   incrementing a number of deallocations by one, and incrementing a number of bytes deallocated by the number of bytes freed.

8. The method according to claim 7, wherein said obtaining step comprises the step of identifying one or more call stacks present as the program executes, wherein each call stack is an ordered list of one or more routines that have been entered during execution of the program, wherein said representing step comprises the step of representing each call stack as a set of nodes in a tree structure, wherein each node represents a routine in the call stack.

9. The method according to claim 8, further comprising the steps of:
   determining if a selected routine is represented in the tree structure; and
   if the selected routine is not represented in the tree structure, adding a new node for the selected routine to the tree structure, wherein the new node is a child node descending from a parent node representing a calling routine.

10. The method according to claim 7, where the recording step is performed during a thread switch.

11. An information handling system, comprising:
    a processor;
    a program which executes on the processor;
    means for obtaining a plurality of trace events which occur as the program executes;
    means for representing the trace events as one or more nodes in a tree structure; and
    means for recording one or more performance statistics at each node in the tree structure, wherein the one or more performance statistics include tracking memory allocation/deallocation.

12. The information handling system according to claim 11, wherein the recording means includes recording a number of times memory is allocated during the performance of the program.

13. The information handling system according to claim 11, wherein the recording means includes recording a number of times memory is deallocated during the performance of the program.

14. The information handling system according to claim 11, wherein the recording means includes recording a number of bytes of memory allocated during the performance of the program.

15. The information handling system according to claim 11, wherein the recording means includes recording a number of bytes of memory deallocated during the performance of the program.

16. The information handling system according to claim 11, further comprising means for deleting one or more nodes from the tree structure upon the occurrence of a selected event.

17. The information handling system according to claim 11, wherein said means for obtaining comprises means for identifying one or more call stacks present as the program executes, wherein each call stack is an ordered list of one or more routines that have been entered during execution of the program.

18. The information handling system according to claim 17, wherein said means for representing comprises means for representing each call stack as a set of nodes in a tree structure, wherein each node represents a routine in the call stack.

19. The information handling system according to claim 18, further comprising:
means for determining if a selected routine is represented in the tree structure; and
means for adding a new node for the selected routine to the tree structure, wherein the new node is a child node descending from a parent node representing a calling routine.

20. The information handling system according to claim 11, further comprising:
means for determining if a selected event is represented in the tree structure; and
means for adding a new node for the selected event to the tree structure, wherein the new node is a child node descending from a parent node representing another event.

21. A computer readable medium, comprising:
means for obtaining a plurality of trace events which occur as a program executes;
means for representing the trace events as one or more nodes in a tree structure; and
means for recording one or more performance statistics at each node in the tree structure, wherein the one or more performance statistics include tracking memory allocation/deallocation.

22. The computer readable medium according to claim 21, wherein the one or more performance statistics include recording a number of times memory is allocated during the performance of the program.

23. The computer readable medium according to claim 21, wherein the one or more performance statistics include recording a number of times memory is deallocated during the performance of the program.

24. The computer readable medium according to claim 21, wherein the one or more performance statistics include recording a number of bytes of memory allocated during the performance of the program.

25. The computer readable medium according to claim 21, wherein the one or more performance statistics include recording a number of bytes of memory deallocated during the performance of the program.

26. The computer readable medium according to claim 21, wherein the recording step further comprises the steps of:
searching free memory for a specified number of bytes;
determining if the specified number of bytes are available;
if the specified number of bytes are available in free memory, selecting the specified area in memory to allocate; and
incrementing a number of allocations, and incrementing a number of bytes allocated by the number of bytes specified.

27. The computer readable medium according to claim 21, wherein the recording step further comprises the steps of:
searching internal control blocks for a specified address;
determining if the address has been found;
if the address has been found, getting a number of bytes allocated and updating the internal control block to free allocation of the bytes; and
incrementing a number of deallocations by one, and incrementing a number of bytes deallocated by the number of bytes freed.

28. The computer readable medium according to claim 21, wherein said means for obtaining comprises means for identifying one or more call stacks present as the program executes, wherein each call stack is an ordered list of one or more routines that have been entered during execution of the program, wherein said means for representing comprises means for representing each call stack as a set of nodes in a tree structure, wherein each node represents a routine in the call stack.

29. The computer readable medium according to claim 28, further comprising:
means for determining if a selected routine is represented in the tree structure; and
means for adding a new node for the selected routine to the tree structure, wherein the new node is a child node descending from a parent node representing a calling routine.

30. The computer readable medium according to claim 21, further comprising:
means for determining if a selected event is represented in the tree structure; and
means for adding a new node for the selected event to the tree structure, wherein the new node is a child node descending from a parent node representing another event.

* * * * *